United States Patent
Rao et al.

(10) Patent No.: US 6,423,248 B1
(45) Date of Patent: Jul. 23, 2002

(54) METHOD OF MAKING GREEN EMITTING ALKALINE EARTH ALUMINATE PHOSPHOR FOR VUV EXCITED LIGHT EMITTING DEVICE

(75) Inventors: Ravilisetty P. Rao, Highland; Daniel J. Devine, New Paltz, both of NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/544,998

(22) Filed: Apr. 6, 2000

(51) Int. Cl.$^7$ .......................... C09K 11/64; C09K 11/55
(52) U.S. Cl. .............................................. 252/301.4 R
(58) Field of Search ................... 252/301.4 R

(56) References Cited

U.S. PATENT DOCUMENTS

| | | | |
|---|---|---|---|
| 4,085,351 A | 4/1978 | Takahashi et al. | 313/486 |
| 5,868,963 A | 2/1999 | Thi et al. | 252/301.4 |

FOREIGN PATENT DOCUMENTS

| | | |
|---|---|---|
| EP | 0697453 A1 | 2/1996 |
| EP | 0908502 A1 | 12/1997 |
| JP | 04214791 | 8/1992 |
| WO | WO 97/47705 | 12/1997 |
| WO | WO 98/37165 | 8/1998 |

OTHER PUBLICATIONS

Barium hexa–aluminate green phosphors by Mai Pham–Thi, ECS Proceedings vol. 97–29 (1998) edited by C. R. Ronda and T. Welker, pp. 246–255.

Phosphors for plasma displays, by Takehiro Kojima in "Phosphor Handbook" edited by S. Shinoya and W. M. Yen, CRC Press (1999) pp. 630–636.

*Primary Examiner*—C. Melissa Koslow
(74) *Attorney, Agent, or Firm*—Ohlandt, Greeley, Ruggerio & Perle, L.L.P.

(57) ABSTRACT

Small particle manganese activated alkaline earth aluminate phosphors are produced by thermal decomposition of gels or powders comprising alkaline earth, manganese salts and an organic precursor such as aluminum isopropoxide at a temperature below the normal solid state reaction temperature. The phosphor of the present invention has the empirical formula:

$$(AE_{1-x}Mn_x)O \cdot 6(Al_2O_3)$$

wherein AE is selected from Ba, Sr, Ca and Mg and $0.01 \leq x \leq 0.1$, having a band emission in the green region, peaking at 516 nm when excited by 147 and 173 nm radiation from Xenon gas mixture. The phosphor obtained by the present method, having uniform particle size distribution (0.05 to 5 microns), is appropriate for thin phosphor screens required for a variety of flat panel display and lamp applications. These phosphors also exhibit high brightness, good color saturation, better stability and shorter persistence when excited with 147 and 173 nm radiation than the currently available commercial phosphor, manganese activated zinc silicate for plasma display panels.

14 Claims, 4 Drawing Sheets

METHOD OF MAKING GREEN EMITTING ALKALINE EARTH ALUMINATE PHOSPHOR FOR VUV EXCITED LIGHT EMITTING DEVICE

FIELD OF THE INVENTION

This invention relates to the development and synthesis of manganese activated. alkaline earth aluminate phosphor particles having a uniform particle size distribution (0.05 to 5 $\mu$m) and a method of forming such particles. More specifically, this invention relates to a development and method of formation of such particles from respective oxides, nitrates and organic precursors which form small particles that improve the performance parameters of higher brightness, shorter persistence, better stability, longer life time and good color saturation as required for flat panel display (FPD) and lamp applications.

BACKGROUND OF THE INVENTION

Manganese activated zinc silicate phosphor is currently used in plasma display panels (PDP) as a green emitting component due to its availability and high quantum efficiency. When compared with other phosphors used for red and blue, zinc silicate phosphor exhibit longer persistence, lower dielectric constant and faster saturation with the VUV flux. Efforts are being made to develop new phosphors to satisfying all requirements and replace manganese activated zinc silicate phosphor. Some other phosphor candidates based on alkaline earth aluminates are being suggested in Phosphor Handbook edited by S. Shionoya and W. M. Yen, pp 630–636, CRC Press, 1999. U.S. Pat. No. 4,085,351 discloses the application of manganese activated aluminate phosphor with either of calcium, strontium, barium, magnesium or zinc in a gaseous discharge light emitting element. In U.S. Pat. No. 5,868,963 M. P. Thi and A. L. Fur describe the preparation of manganese activated barium aluminate by calcinating the mixture of alumina, barium carbonate, manganese carbonate at 1450° C. for two hours in dry nitrogen. T. Hisamune et al. in EP 0 908 502 A1 teach the preparation of barium or strontium magnesium aluminate by firing respective oxides or carbonate in presence of flux (AIF$_3$) at 1450° C. for 48 hours (total time). Mark H. Smith et al in WO 98/37165 describe a method of making oxygen containing phosphor powder, including alkaline earth aluminates by spray techniques. According to that invention, spray dried powder was converted to oxide at 1000° C. and then re-fired at 1600° C. for about four hours.

The main application of large area plasma displays will be HDTV and high information content presentation. HDTV and similar type of display devices should have phosphors with low dielectric constant, required decay time, high resolution and high brightness for high performance. This can be achieved only with thin phosphor screens consisting of small phosphor particles in a close rib structure or closed cell structure. Screens with small particles exhibit higher packing density and also need reduced binder content. Persistence, another concern in selecting a phosphor, should be between 4 and 9 ms. Also, the three phosphors (red, green and blue) currently used in PDP's have different-dielectric constants and particle morphology. Due to their physical nature, all of the three phosphors need different rheology of phosphor paste as well as different screening processes. In PDP applications these phosphors exhibit different electrical characteristics in a finished panel. The higher dielectric constant of zinc silicate phosphor is of particular concern as it charges more than its blue and red counterparts and this results in a higher sustainer voltage. This results in compromises in the performance of the display. In consideration of these problems, we have dedicated our efforts to developing phosphors consisting of similar host materials, which exhibit suitable red, green and blue emission under Xenon plasma excitation.

SUMMARY OF THE INVENTION

Accordingly, it is an objective of the present invention to provide a method of preparation of manganese activated alkaline earth aluminate phosphor having the empirical formula:

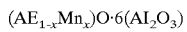

wherein AE is selected from Ba, Sr, Ca and Mg and $0.01 \leq x \leq 0.1$.

The present invention compares the synthesis of manganese activated alkaline earth aluminate phosphor by two different processes: a conventional solid state reaction process and our sol-gel process. Depending on the required particle size distribution, the sol-gel process is superior for preparing very fine particles (0.05 to 2 microns) and the solid state reaction is superior for normal size particles (2 to 6 microns).

The sols are dispersions of colloidal particles in a liquid. The gravitational forces on the particles are negligible. From a sol, a gel is formed with an interconnected, rigid network, having sub-micrometer pores and a polymeric chain whose average length is of the order of microns. The particle size of the finished product is a function of the initial concentration of the starting sols, gelation process, drying of gels, calcination temperature and rate of cooling.

The sol-gel process offers many advantages over conventional methods in the synthesis of fine powders and particularly phosphor materials. Since all of the starting materials are mixed at the molecular level in a solution, a high degree of homogeneity is achievable. Doping of impurities (activators/co-activators/sensitizers) through solutions is straightforward, easy and effective. The pores in properly dried gels are often extremely small and the components of a homogenous gel are intimately mixed. The surface area of powders produced from sol-gel is very high, leading to lower processing temperatures.

Phosphor materials are extremely sensitive to impurities; even in ppb levels, the low-temperature process through sol-gel process minimizes the potential for cross contamination. Some of the unwanted impurities left in the materials from conventional methods may pose a threat to the performance of a phosphor. As the size of the phosphor particle decreases, the probability of electron and hole capture to the impurity increases and the e-h localization enhances the recombination rate via the impurity. The optimum impurity concentration (activator) level can be further increased with small particle size. The present invention is related to the growth of Mn$^{2+}$ doped alkaline earth aluminate phosphor by sol-gel methods.

More specifically, the present invention provides a process for forming a Mn$^{2+}$ doped alkaline earth aluminate phosphor having the empirical formula:

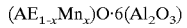

wherein AE is selected from Ba, Sr, Ca and Mg and $0.01 \leq x \leq 0.1$, the process comprising:

(1) reacting a dilute solution comprising a source of an alkaline earth, a source of manganese and an organic precursor providing a source of aluminum, in an acid medium to form a dilute gel (sol-gel process);

(2) converting the dilute gel into a xerogel powder (room temperature drying) or converting the dilute gel into an aerogel powder (vacuum drying); or converting the dilute gel into a gel powder (spray drying); and, (3) thermally decomposing the powders obtained from the above, at specified temperatures.

DETAILED DESCRIPTION OF THE INVENTION

Figure 1:
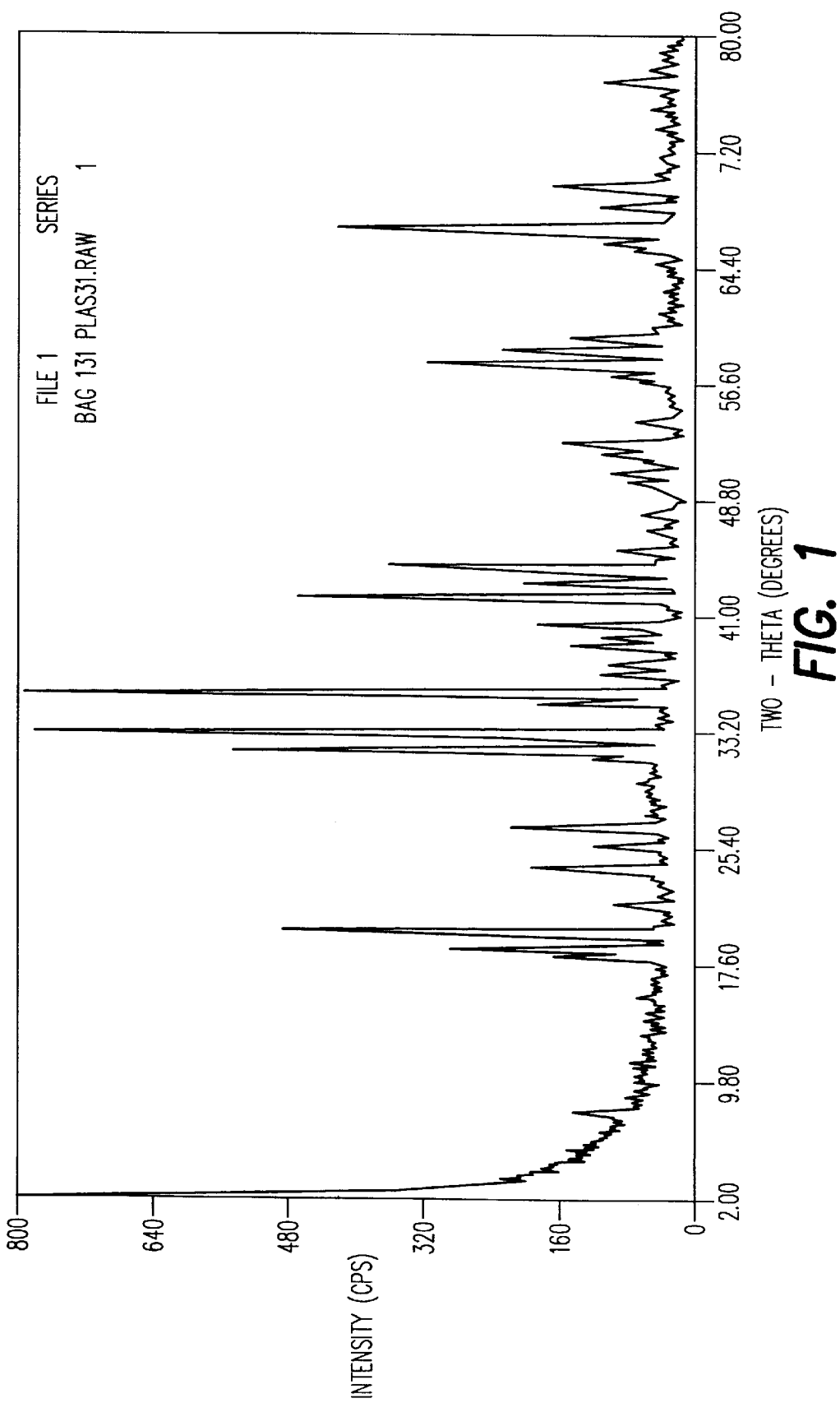
FIG. 1 shows x-ray diffraction pattern of Mn activated barium aluminate phosphor prepared from xerogel.

There are a number of display applications where a green phosphor with high brightness, shorter persistence, color purity (saturation), better stability and long life (time of operation) would significantly improve the display's performance. The green component is very important, as the human eye photonic response has its peak sensitivity at approximately 535 nm (green component of the visible spectrum). Since commercially available zinc silicate based phosphors fail to satisfy all the above requirements, a new phosphor and its synthesis process that overcomes the above limitations was developed. The small size phosphor particles are particularly suitable for use in applications in which a high packing density is required. The result of this development effort is the basis of the present invention.

This invention provides a method of synthesizing alkaline earth aluminate phosphors incorporating high concentrations of activator ion ($Mn^{2+}$). The formation of the alkaline earth aluminate solid solution is critical and is highly dependent on the reaction temperature and conditions.

In a solid state reaction, respective oxides are reacted at high temperatures in the presence of a flux (example $AlF_3$). At these temperatures, proper doping of impurity ions into the lattice of the complex is uncertain. Finally, the high temperature process will lead to growth of uneven and larger particles.

The Sol-gel process can be divided into two categories: one, an aqueous-based process that starts from a solution of a metal salt and second, an alcohol-based process that starts from a metal alkoxide. In this invention, an aqueous based process is adopted by considering the cost and availability of the starting chemicals. Since the purity of starting chemicals is very important to the synthesis of phosphors, the starting chemicals are typically 99.9 to 99.999% in purity. It is important to minimize the concentration of specific contaminants such as iron, which can seriously degrade the phosphor performance.

Required metal (Ba/CalSr/Mg and Mn) solutions are also prepared by mixing appropriate amounts of respective metal nitrates in a lukewarm DI water to obtain 0.05 to 0.1M solutions. The metal hydroxide precursor was prepared by precipitating an aqueous solution of metal chloride or metal nitrate (0.01 to 0.05M) in water by the addition of a base such as ammonium hydroxide to the solution. Stoichiometric quantities of metal solutions and aluminium isopropoxide are mixed. The metal/isopropoxide solution is transferred to a round bottom flask and peptized at 80° to 100° C. for 9 to 18 hours in a stirrer mantle. In the present invention inorganic acid such as $HNO_3$ or HCl has been employed to maintain a low pH which is required to effect gelation.

After the pepitization, sol/gels are left in a container until they become a thick gel (3 to 5 days) and then a xerogel. Aerogels are also prepared from the same dilute gels by extracting the water and other solvents in vacuum through a cold trap. These xerogels or aerogels are transferred into a lab oven at 60° to 70° C. and left for a day or until becoming powder. This step is inserted to accelerate the removal of any residual solvent. Gel powders are also prepared by spray drying. Dilute gels are sprayed through a fine spray nozzle into a 4" diameter glass tubing which has been heated to 120° to 150° C. An alternate process for forming particles can be accomplished using an ultrasonic aerosol generator. After drying, gel powder is collected from the tube. These powders are transferred into a high grade alumina crucible and subjected to two heat cycles. In the first heat cycle, the sample is soaked for 2. hours at 300° C. to burn-out residual organic component and then heated to 900° to 1000° C. for 3 to 6 hours to form the respective oxide. In the second heat cycle, powder samples are reheated to 1000° to 1200° C. in a forming gas (5%$H_2$+95%$N_2$) for 3 to 6 hours to improve the crystallinity of the product. After cooling to room temperature, the aggregate mass is crushed gently (eg.,in a mortar and pestal). The crushed powder is then washed with deionized water and dried at 100° C. for 4 to 6 hours to remove very small particles (<0.05 microns) and any extraneous soluable component.

X-ray powder diffraction data on samples fired at 1000° C. and refired at 1200° C. ($N_2$+$H_2$) is shown in FIG. 1. The samples fired at 1000° C. show some of the lines corresponding to barium aluminate phase. The lines corresponding to barium aluminate phase are more prominent with increasing firing temperature.

Figure 2:
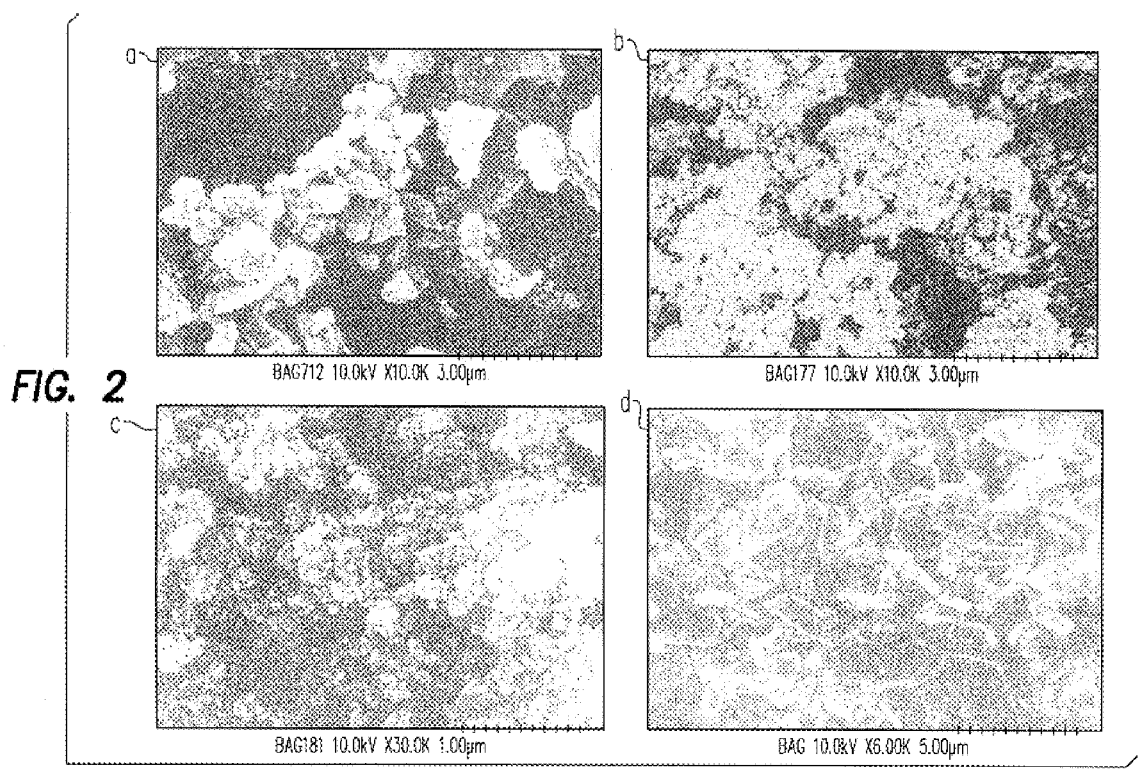
FIG. 2 illustrates scanning electron micrographs of Mn activated barium aluminate phosphors prepared from a) xerogel, b) aerogel, c) spray dried powder and d) oxides and nitrates (solid state process).

Since the luminescence of a phosphor depends on the shape, size, crystallinity, defects and grain boundaries, the morphology and PSD of all the samples prepared at various conditions were studied. Scanning electron micrographs of phosphor samples prepared at various conditions are shown in FIG. 2. From the photomicrographs, one can observe that the phosphor particles are very uniform in size. The samples are washed with water after calcination to eliminate very small particles (<0.05 microns) as well as organic residues and allowed to dry. The emission characteristics of these phosphors are carried out on compacted powders, at room temperature.

Figure 3:
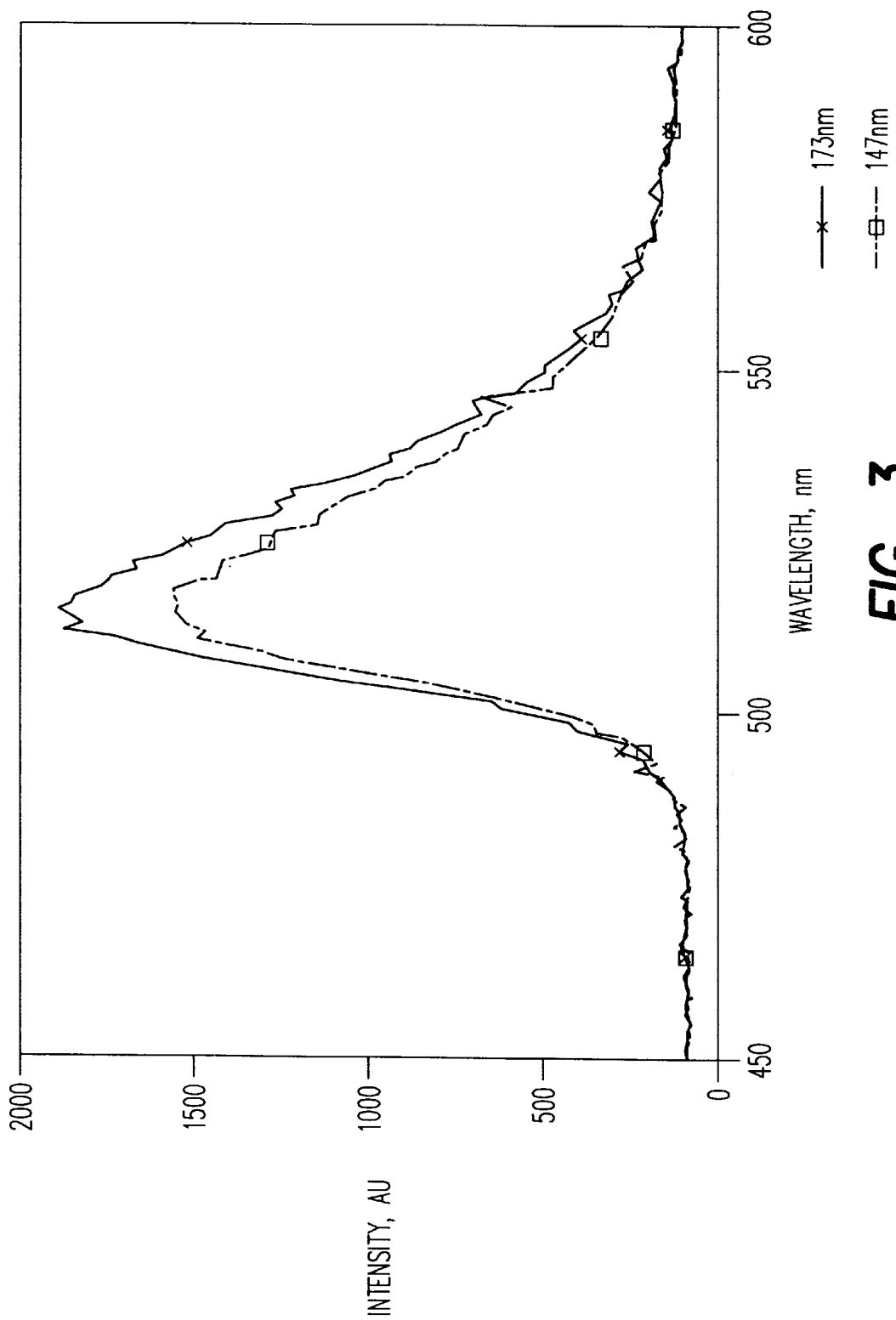
FIG. 3 show emission spectra of Mn activated barium aluminate phosphor of present invention prepared from aerogel excited at (a) 147 nm and (b) 173 nm. The emission was recorded at room temperature.
Figure 4:
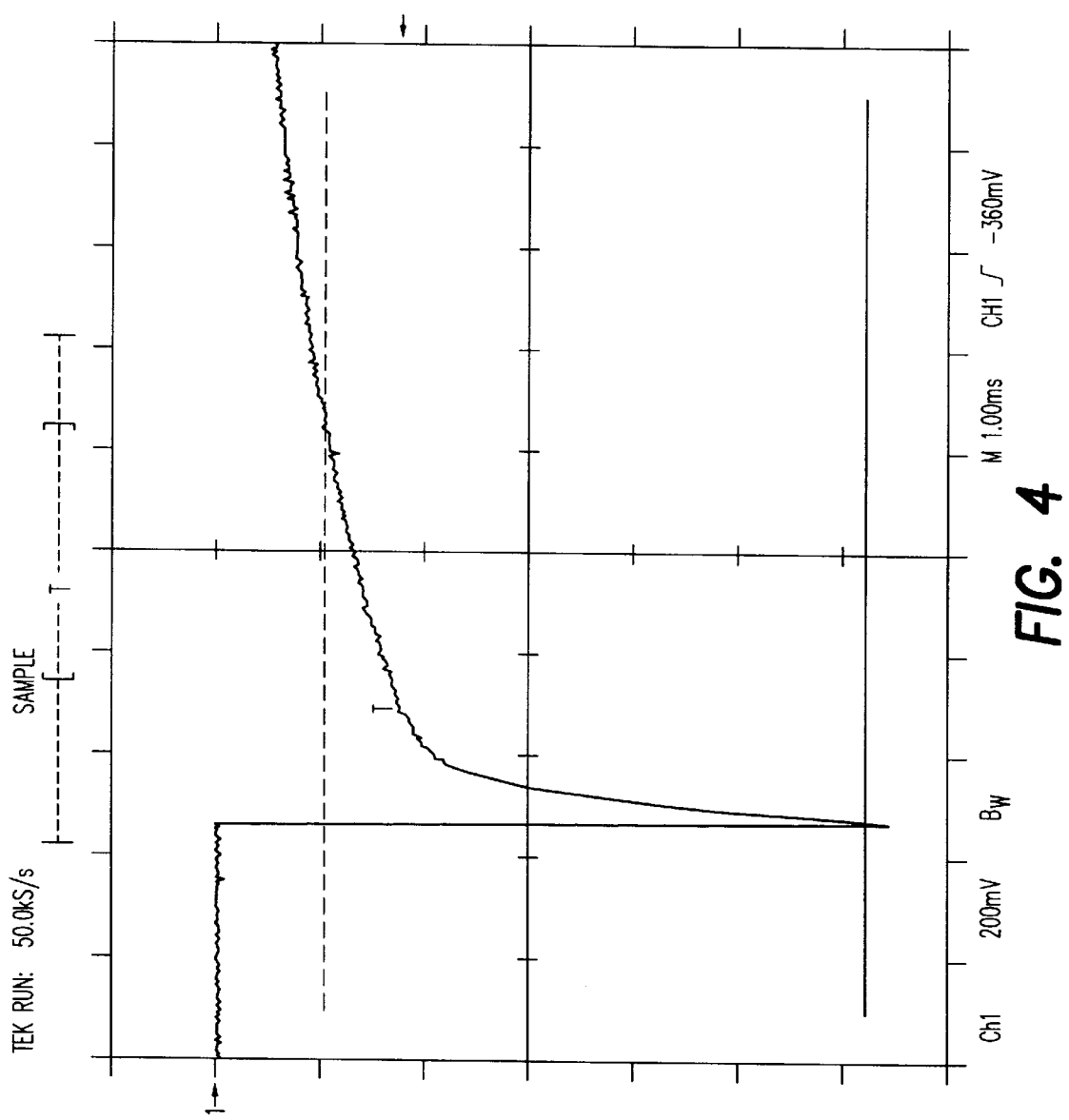
FIG. 4 shows persistence of Mn activated barium aluminate phosphor prepared from aerogel recorded at room temperature (excitation source xenon flash lamp with 232 nm optical filter).

The emission spectrum of Mn activated alkaline earth (Ba/Sr/Ca/Mg) aluminate phosphors prepared from metal nitrates recorded at room temperature under VUV excitation (147 nm or 173 nm) are shown in FIG. 3. The decay characteristics (decay or persistence) of Mn activated barium aluminate phosphor recorded at room temperature while exciting with Xe flash lamp, is shown in FIG. 4.

Further details of this invention will be described with reference in the following examples.

EXAMPLE I

The preparation of Mn activated barium aluminate phosphor in an acid catalyzer by a sol-gel process is described in this example. 20 Grams of aluminum isopropoxide (AIP) is dissolved in 4 liters of hot water (95° C.) while stirring. 3.91 Grams of barium nitrate and 0.28 grams of manganese nitrate are added to AIP solution. When the solution reaches 110° C., 5 cc HCl (0.5 mol) is added drop wise and refluxed for 24 hours. A water condenser column is maintained at 20° C. throughout the reflux by use of a circulating chiller. After cooling the flask to room temperature, the solution (dilute gel) is transferred into a crystallizing dish (3L capacity) and left in an open atmosphere. After 5 to 6 days, the solution becomes a gel.

These transparent hard gels are left at 45° to 50° C. for 12 hours in a lab oven. The dried product appears like soft glass, called xerogel. After crushing the gel in a glass mortar and pestle, a fine powder is collected into a high grade alumina boat and fired at 300° C. for 2 hours (rate of heating is 2°/min.) and then 900° to 1000° C. for 3 to 6 hours, with the same rate of heating, in a box furnace. Sample are re-fired in a forming gas (5%$H_2$+95% $N_2$) at 1000° to 1200° C. for 3 to 6 hours in a tube furnace. The sample is left in the furnace until it cools down to room temperature.

A hard mass is obtained after cooling. These fine phosphor powders are subjected to ultrasonic agitation in water. Ultrasonic treatment helps to break the clusters in to very small particles. After washing with water, these powders are dried at 100° C. for 6 hours. Depending on the required amounts, this can be scaled up.

The emission and persistence characteristics of the above phosphor recorded at room temperature while exciting with excitation sources (Xe lamp), are given in Table I.

EXAMPLE II

The preparation procedure is the same as in Example I except 3.92 grams of barium nitrate is replaced by 3.18 grams of strontium nitrate.

EXAMPLE III

The preparation procedure is the same as in Example II except 3.18 grams of strontium nitrate is replaced by 3.54 grams of calcium nitrate.

EXAMPLE IV

The preparation procedure is the same as in Example III except 3.54 grams of calcium nitrate is replaced by 2.22 grams of magnesium nitrate.

EXAMPLE V

The preparation procedure is the same as in Example 1 except 20 grams of aluminum isopropoxide is replaced by 24.1 grams of aluminum s-butoxide.

EXAMPLE VI

Synthesis of diluted gels from alkaline earth nitrate, manganese nitrate and aluminum isopropoxide in an acid medium is the same as described in Example I. Gel solutions obtained. are subjected to freeze drying under vacuum. A cold trap is introduced between the vacuum pump and vacuum jar with gel. Dried powder is collected after a few hours of freeze drying at the bottom of the flask. These powders are subjected to calcination, cooling, washing and measurements as described in Example I.

EXAMPLE VII

Synthesis of diluted gels from alkaline earth nitrate, manganese nitrate and aluminum isopropoxide in an acid medium is the same as described in Example I. These diluted gels are sprayed through a spray nozzle in a 4" diameter glass tube, with a 12" heating zone at 120° to 150° C. Fine particles can also be produced using an ultrasonic aerosol generator (nebulizer). After spraying about a liter of dilute gel, very fine powder is scraped from the walls of the tube. These powders are subjected to calcination, cooling washing and measurements as described in Example I.

EXAMPLE VIII

30 Grams of aluminum oxide dust (0.01 to 0.02 microns), 11.5 grams of barium nitrate, 0.82 grams of manganese nitrate and 1 gram lithium nitrate (flux) are mixed and transferred to high grade alumina boats. These powders are subjected to calcination, cooling, washing and measurements as described in Example I.

TABLE I

| Method of Preparation | Luminescence Characteristics and Morphology of Manganese Activated Barium Aluminate Phosphors | | | | | | |
|---|---|---|---|---|---|---|---|
| | Relative Intensity (AU) @ Excitation | | Half Width | Persistence (10%) | Color Coordinates | | Particle Size |
| | 147 nm | 173 nm | nm | (ms) | x | y | (μm) |
| Xerogel (Ex-I) | 100 | 102 | 40 | 7 | 0.187 | 0.729 | 0.1–3.0 |
| Aerogel (Ex-VI) | 104 | 106 | 40 | 7 | 0.176 | 0.727 | 0.1–2.0 |
| Spray (Ex-VII) | 94 | 95 | 41 | 6 | 0.178 | 0.715 | 0.05–1.0 |
| Sold St. (Ex-VIII) | 98 | 100 | 39 | 9 | 0.182 | 0.720 | 1.0–6.0 |

As the data of Table I demonstrates, the phosphors formed by sol-gel processes and solid state reaction of the present invention, provide various particle size ranges, while also generally providing a higher level of brightness and shorter persistence.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed. is:

1. A method of forming a manganese activated alkaline earth aluminate phosphor having the empirical formula:

$$(AE_{1-x}Mn_x)O \cdot 6(Al_2O_3)$$

wherein AE is selected from the group consisting of Ba, Sr, Ca and Mg and $0.01 \leq x \leq 0.1$, said method comprising the steps of: reacting a dilute solution comprising a source of manganese, a source of alkaline earth, and an organic precursor providing a source of aluminum to form a gel in an acid medium; converting said gel into a gel powder; and thermally decomposing said gel at a temperature below a solid state reaction temperature to obtain said phosphor.

2. The method of claim 1, wherein said source of alkaline earth is selected from the group consisting of alkaline earth nitrates, said source of manganese is manganese nitrate and said organic precursor providing a source of aluminum is aluminum isopropoxide.

3. The phosphor of claim 1, wherein said source of manganese and alkaline earth is selected from the respective hydroxides, and said organic precursor providing a source of aluminum is aluminum isopropoxide.

4. The method of claim 1, wherein said source of alkaline earth is selected from the group consisting of alkaline earth nitrates, said source of manganese is manganese nitrate and said organic precursor providing a source of aluminum is aluminum s-butoxide.

5. The phosphor of claim 1, wherein said source of manganese and alkaline earth is selected from the respective hydroxides, and said organic precursor providing a source of aluminum is aluminum s-butoxide.

6. The method of claim 1, wherein said gel is thermally decomposed in an open atmosphere at about 1000° C. and then at a temperature equal to about 1200° C. in a forming gas.

7. The method of claim 1, wherein said gel is dried to form a xerogel and said xerogel is crushed to form a powder prior to thermal decomposition.

8. The method of claim 1, wherein said gel is vacuum dried to form a aerogel and said aerogel is crushed to form a powder prior to thermal decomposition.

9. The method of claim 1, wherein said gel is spray dried to form gel powder and said gel powder is crushed to form a powder prior to thermal decomposition.

10. The method of claim 1, wherein said gel is sprayed ultrasonically and dried to form gel powder and said gel powder is crushed to form a powder prior to thermal decomposition.

11. The method of claim 7, wherein said phosphor has a particle size in the range of 0.1 to 3.0 microns.

12. The method of claim 8, wherein said phosphor has a particle size in the range of 0.1 to 2.0 microns.

13. The method of claim 9, wherein said phosphor has a particle size in the range of 0.05 to 1.0 microns.

14. The method of claim 1, where said phosphor comprises from about 0.9 mol to about 0.99 mol of alkaline earth (Ba/Sr/Ca/Mg), from about 0.01 mol to about 0.1 mol of manganese, and about 6.0 mols of aluminum.

* * * * *